Nov. 24, 1925.

W. S. PORTER ET AL 1,562,848

SHOCK ABSORBER

Filed Aug. 30, 1923

William S. Porter
Hugh L. Hughes
INVENTORS

BY Leak C. Fischer
ATTORNEY

Patented Nov. 24, 1925.

1,562,848

UNITED STATES PATENT OFFICE.

WILLIAM S. PORTER AND HUGH L. HUGHES, OF WEEHAWKEN, NEW JERSEY, ASSIGNORS TO NOJAR MANUFACTURING COMPANY, INC., OF NEW YORK, N. Y., A CORPORATION OF NEW YORK.

SHOCK ABSORBER.

Application filed August 30, 1923. Serial No. 660,105.

*To all whom it may concern:*

Be it known that we, WILLIAM S. PORTER and HUGH L. HUGHES, both citizens of the United States, and both residing at Weehawken, in the county of Hudson and State of New Jersey, have invented certain new and useful Improvements in Shock Absorbers, of which the following is a specification.

This invention relates to shock absorbers as used in connection with vehicles and more particularly to types adapted to prevent or minimize the rebounding effect of springs interposed between the axles of a vehicle and the chassis or frame thereof.

One of the objects of the invention is to provide devices in the form of attachments readily applied to existing structures without damage or defacement, and which will effectively operate to prevent an undesirable rebound of the vehicle body when the same is passing over irregular surfaces.

Another purpose is to produce a neat compact apparatus in which the strap connecting between the chassis frame and axle is maintained invariably in a moderately taut condition and completely housed within its casing.

These several aims and objects are attained by the novel construction, combination and arrangement of parts hereafter described and shown in the accompanying drawing, forming a material part of this disclosure, and in which.

Figure 1:
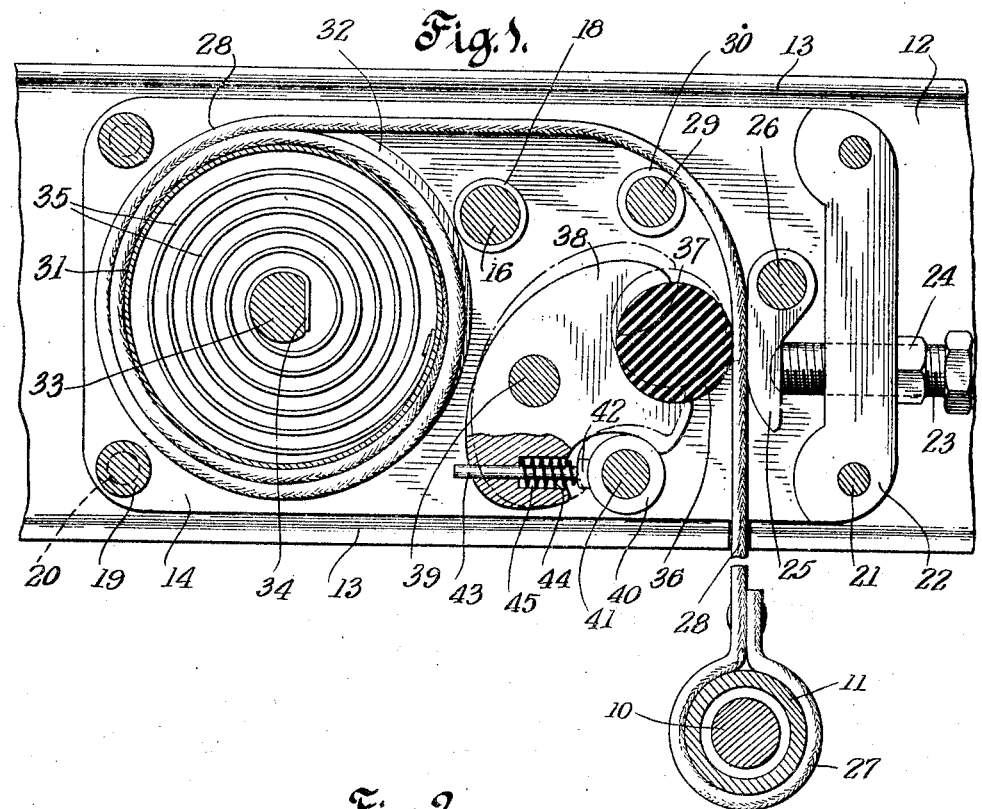
Figure 1 is a partial sectional, partial side elevational view of a device made in accordance with the invention, the outer or cover plate being removed.
Figure 2:
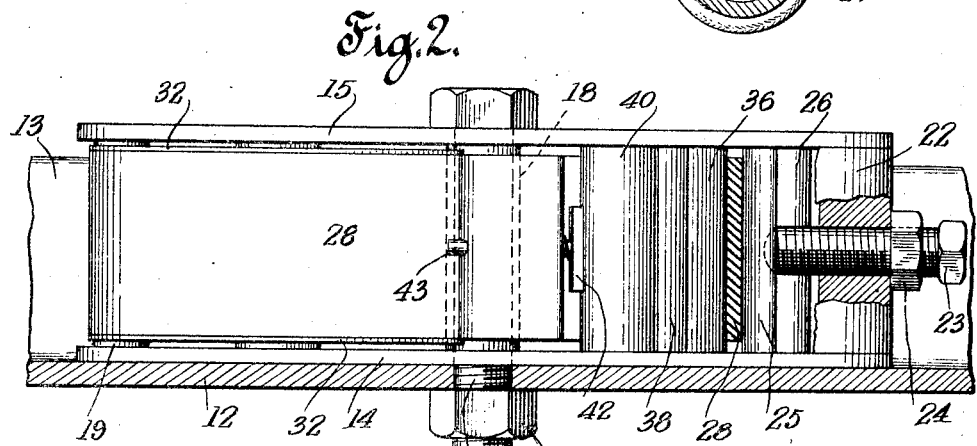
Figure 2 is a bottom plan view of the same, parts being broken away to show the construction.

Referring to the drawing, the numeral 10 designates the axle of the vehicle, usually covered by a casing 11, these elements being transverse and below the chassis frame, as indicated by the rolled steel channel 12 having flanges 13, said channels, one upon each side, extending the length of the vehicle.

A casing, suited to be received between the flanges 13, is composed of two similar flat metal plates 14 and 15, respectively inner and outer, these plates being held to the channel wall by a bolt 16, said bolt passing through a spacing sleeve 18 between the plates and being provided with a nut 17 on the outer side of the channel web.

These plates, which are essentially elongated rectangles with rounded edges, are further held in relation to studs 19, having reduced portions 20 at their ends riveted into corresponding holes in the corners of each plate at one end thereof.

At the opposite corners are riveted pins 21 passing through a spacing block 22 filling the space at the end and being drilled and tapped transversely of the end to receive a clamp screw 23 provided with a lock nut 24 for holding it in adjustment.

The point of the screw 23 bears against the back of a friction block 25 pivoted pendantly on a stud 26 fixed between the plates.

Surrounding the axle casing 11 is the bight of a closed loop 27 formed at the end of a flexible strap 28, made of webbing fabric, leather, rawhide or sheet metal, the strap passing upward into the casing, past the face of the block 25, over a stud 29 fixed between the plates and covered by a suitable roller sleeve 30.

The strap continuing past the roller is engaged on a drum 31 having flanges 32 rotatable on a stud 33 also fixed between the plates.

The stud 33, between the flanges is flattened at 34 and attached thereto is the inner convolution of a flat, spirally wound spring 35, the outer coil of which is engaged to the inner surface of the drum or reel 31, tending to impart motion to it and maintain the strap in a normally taut condition, rewinding any slackened portion at once.

A friction roll 36 of indurated fibre, condensite or the like, is disposed on the opposite side of the strap from the pivoted block 25, slightly above the plane of the screw 23.

This roll is revolubly mounted in a recess 37 at the front of a rocker 38, pivoted on a stud 39 fixed between the casing plates and so proportioned as to incline towards the strap, it being limited in its movement by contact with a roller 40 mounted on a stud 41 between the plates.

Also in contact with the face of the roller 40 is a plunger 42, its rearwardly extending stem 43 being slidable in a portion of the rocker 38, below its pivoted point, the plunger 42 being urged into contact by a helically coiled compression spring 44 surrounding the stem and housed in the counterbored opening 45 of the rocker.

In operation, when the distance between the axle 10 and frame channel 12 is diminished, even momentarily, the accompanying slackness occurring in the strap 28 is automatically taken up, the action of drawing the strap, towards the drum, raising the roll 36 and releasing its grip.

Should this motion be rapid the tendency is to throw the roll up, whereupon it makes contact with the cushioned roller 30, avoiding noisiness and jar.

Similarly, when the distance between the axle and frame is increased, by jolting or otherwise, the roll 36 grips the strap firmly clamping it between its periphery and the face of the block 25, the limit of downward and hence gripping action of the roll being determined by the cushion roller 40, which also acts to eliminate noise and jar.

Obviously a continued pull on the strap causes the roll 36 to rotate and allow such length of the strap to pass as is required, this effect being controlled by proper adjustment of the screw 23.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described our invention, what we claim as new and desire to secure by Letters Patent, is:—

1. A shock absorber for vehicles comprising a casing adapted to be fixed to the vehicle frame, a member extending from said casing to be secured to the vehicle axle, a friction roll against which said member is disposed, a rocking support for said friction roll, a pivoted friction block opposed to said roll, and means for adjusting said block.

2. A shock absorber for vehicles comprising a casing fixed to the vehicle frame, a drum in said casing, spring means associated with said drum for causing rotation in one direction, a flexible strap operatively connected with said drum at one end, the other end being secured to the vehicle axle, a friction roll rockingly mounted in said casing in normal contact with said strap, sound deadening means for limiting the oscillating motion of said roll, a movable friction block opposite said roll, an adjustable screw for said block, and means for locking said screw.

3. A shock absorber for vehicles comprising a casing fixed to the vehicle frame, a drum in said casing, spring means associated with said drum for causing rotation in one direction, a flexible strap operatively connected with said drum at one end, the other end being secured to the vehicle axle, a block oscillatably mounted in said casing, a friction roll rotatable in said block, a stop limiting the motion of said block, means carried by said block normally causing said roll to engage the strap, and adjustable means for forcing said strap against the roll.

4. A shock absorber for vehicles comprising a pair of spaced plates rigidly fixed on the frame of the vehicle, a spring actuated drum revoluble between said plates, a flexible member fixed at one end to said drum and at the other end to the axle of the vehicle, a friction roll against which said member is disposed, a rocking support for said roller, a pivoted friction block opposed to said roll, and means for adjusting said block.

5. A shock absorber for vehicles comprising a casing composed of two plates rigidly secured in spaced relation to the frame of a vehicle, a spring actuated drum revoluble in said casing, a flexible member secured to and trained over said drum, the opposite end of said member passing out of the casing and being secured to the vehicle axle, a guide roller over which said member passes, a rocker pivoted in said frame, a friction roll revoluble in said rocker in contact with said member, a stop for limiting the movement of said rocker, a swinging friction block opposite said roller, and a screw for adjusting said block.

This specification signed this 20th day of August, 1923.

WILLIAM S. PORTER.
HUGH L. HUGHES.